US011403300B2

(12) United States Patent
Venkoba et al.

(10) Patent No.: US 11,403,300 B2
(45) Date of Patent: Aug. 2, 2022

(54) METHOD AND SYSTEM FOR IMPROVING RELEVANCY AND RANKING OF SEARCH RESULT

(71) Applicant: Wipro Limited, Bangalore (IN)

(72) Inventors: Raghavendra Rao Venkoba, Bangalore (IN); Suraj Vantigodi, Dharwad (IN); Cyrus Andre Dsouza, Bardez (IN); Manu Kuchhal, Gurgaon (IN)

(73) Assignee: Wipro Limited, Bangalore (IN)

( * ) Notice: Subject to any disclaimer, the term of this patent is extended or adjusted under 35 U.S.C. 154(b) by 229 days.

(21) Appl. No.: 16/370,937

(22) Filed: Mar. 30, 2019

(65) Prior Publication Data

US 2020/0265055 A1 Aug. 20, 2020

(30) Foreign Application Priority Data

Feb. 15, 2019 (IN) .............................. 201941006139

(51) Int. Cl.
| | |
|---|---|
| *G06F 16/00* | (2019.01) |
| *G06F 16/2457* | (2019.01) |
| *G06F 16/93* | (2019.01) |
| *G06F 16/248* | (2019.01) |

(52) U.S. Cl.
CPC ...... *G06F 16/24578* (2019.01); *G06F 16/248* (2019.01); *G06F 16/93* (2019.01)

(58) Field of Classification Search
CPC ... G06F 16/93; G06F 16/248; G06F 16/24578
USPC ........................................................ 707/730
See application file for complete search history.

(56) References Cited

U.S. PATENT DOCUMENTS

| | | | |
|---|---|---|---|
| 6,336,117 B1 | 1/2002 | Massarani | |
| 6,654,742 B1 * | 11/2003 | Kobayashi | ............. G06F 16/30 707/999.005 |
| 7,197,497 B2 | 3/2007 | Cossock | |
| 7,739,264 B2 * | 6/2010 | Jones | .................. G06F 16/3338 705/14.52 |
| 7,793,230 B2 * | 9/2010 | Burns | ................... G06F 16/338 715/833 |
| 8,706,742 B1 * | 4/2014 | Ravid | ..................... G06N 5/04 707/740 |

(Continued)

*Primary Examiner* — Ashish Thomas
*Assistant Examiner* — Rezwanul Mahmood
(74) *Attorney, Agent, or Firm* — Finnegan, Henderson, Farabow, Garrett & Dunner, LLP

(57) ABSTRACT

This disclosure relates to method and system for improving relevancy and ranking of a search result for a search query. The method may include accessing documents of the search result. Each document may be associated with derived document features that may be derived based on an evaluation of document features with respect to query features. For each document, the method may further include determining a feature score for each of the derived document features based on one or more of the query features and initializing each element of an order array with the feature score for each ordered document feature. The ordered document features may be the derived document features that are ordered based on pre-defined rules. The method may further include ranking the documents by comparing and ranking the order array for each of the documents and presenting an updated search result based on the ranking of the documents.

18 Claims, 6 Drawing Sheets

(56) References Cited

U.S. PATENT DOCUMENTS

| | | | |
|---|---|---|---|
| 10,402,641 B1* | 9/2019 | Dang | G06F 17/18 |
| 10,990,602 B2* | 4/2021 | Bangalore Narayanamurthy | G06F 16/9024 |
| 2005/0165838 A1 | 7/2005 | Fontoura et al. | |
| 2006/0224577 A1* | 10/2006 | Hullender | G06F 16/951 |
| | | | 707/999.005 |
| 2007/0112837 A1* | 5/2007 | Houh | G06F 16/78 |
| 2007/0130123 A1* | 6/2007 | Majumder | G06F 16/3347 |
| | | | 707/E17.08 |
| 2007/0208744 A1* | 9/2007 | Krishnaprasad | H04L 63/083 |
| | | | 707/999.009 |
| 2007/0239707 A1* | 10/2007 | Collins | G06F 16/35 |
| | | | 707/999.005 |
| 2008/0114721 A1* | 5/2008 | Jones | G06F 16/3338 |
| 2008/0140699 A1* | 6/2008 | Jones | G06F 16/3325 |
| | | | 707/999.102 |
| 2009/0006382 A1* | 1/2009 | Tunkelang | G06F 16/3331 |
| | | | 707/999.005 |
| 2009/0030754 A1* | 1/2009 | McNamar | G16H 15/00 |
| | | | 707/E17.014 |
| 2009/0327274 A1* | 12/2009 | Kejariwal | G06F 16/951 |
| | | | 707/999.005 |
| 2010/0094840 A1* | 4/2010 | Donnelly | G06Q 30/02 |
| | | | 707/E17.061 |
| 2010/0094879 A1* | 4/2010 | Donnelly | G06F 16/93 |
| | | | 707/E17.071 |
| 2010/0125570 A1* | 5/2010 | Chapelle | G06F 16/951 |
| | | | 707/E17.014 |
| 2010/0169375 A1* | 7/2010 | Cumby | G06F 16/3346 |
| | | | 707/780 |
| 2010/0205183 A1* | 8/2010 | Banachowski | G06F 16/951 |
| | | | 707/748 |
| 2011/0004588 A1* | 1/2011 | Leitersdorf | G06F 16/951 |
| | | | 707/711 |
| 2011/0040752 A1* | 2/2011 | Svore | G06F 16/338 |
| | | | 707/E17.014 |
| 2011/0106850 A1* | 5/2011 | Li | G06F 16/335 |
| | | | 707/E17.014 |
| 2012/0030152 A1* | 2/2012 | Pueyo | G06F 16/3331 |
| | | | 707/723 |
| 2012/0078906 A1* | 3/2012 | Anand | G06Q 10/105 |
| | | | 707/E17.089 |
| 2013/0173571 A1* | 7/2013 | Chen | G06F 16/951 |
| | | | 707/706 |
| 2015/0220631 A1* | 8/2015 | Sherman | G06F 16/93 |
| | | | 707/723 |
| 2015/0285951 A1* | 10/2015 | Rangarajan | G06K 9/6228 |
| | | | 703/10 |
| 2015/0310114 A1* | 10/2015 | Ryger | G06F 16/24578 |
| | | | 707/728 |
| 2015/0310131 A1* | 10/2015 | Greystoke | G06F 16/951 |
| | | | 707/722 |
| 2016/0026634 A1* | 1/2016 | Allen | G06F 40/20 |
| | | | 707/740 |
| 2017/0076219 A1* | 3/2017 | Byrnes | G06N 20/00 |
| 2017/0249434 A1* | 8/2017 | Brunner | G06F 16/258 |
| 2018/0032870 A1* | 2/2018 | Liu | G06Q 40/025 |
| 2018/0129659 A1* | 5/2018 | Jehan | G06N 20/00 |
| 2018/0189797 A1* | 7/2018 | Ravi | G06Q 30/018 |
| 2018/0218283 A1* | 8/2018 | Jenson | G06Q 50/01 |
| 2018/0349405 A1* | 12/2018 | Augustine | G06F 16/93 |
| 2019/0065744 A1* | 2/2019 | Gaustad | G06F 21/562 |
| 2019/0102413 A1* | 4/2019 | Hsu | G06F 16/2237 |
| 2019/0205465 A1* | 7/2019 | Kulkarni | G06F 3/02 |
| 2020/0085382 A1* | 3/2020 | Taerum | G06K 9/6274 |
| 2020/0242123 A1* | 7/2020 | Venkoba | G06F 16/248 |
| 2020/0265055 A1* | 8/2020 | Venkoba | G06F 16/9038 |
| 2020/0341974 A1* | 10/2020 | Bowden, Jr. | G06F 16/24575 |
| 2020/0380675 A1* | 12/2020 | Golden | G16H 30/40 |

* cited by examiner

METHOD AND SYSTEM FOR IMPROVING RELEVANCY AND RANKING OF SEARCH RESULT

This application claims the benefit of Indian Patent Application Serial No. 201941006139, filed Feb. 15, 2019, which is hereby incorporated by reference in its entirety.

FIELD

This technology relates generally to information retrieval, and more particularly to methods and systems for improving relevancy and ranking of a search result.

BACKGROUND

Search systems generally use indexing process for collecting, parsing and storing data in a database for subsequent use by the search engine. The search system may store the collected data in an index so that when the user enters a search query, the search engine refers the index to provide a search result in response to the search query. As will be appreciated, the search result may include a reference to a number of documents that matches the search query. The reference may be in form of a page that is stored within the index. Further, as will be appreciated, if indexing functionality was not available with the search engine, the searching process may take considerable amount of time and effort each time a search was initiated for a search query. This may be largely because the search engine would have to search a lot including every web page or piece of data associated with the keywords used in the search query. Consequently, the quality of the search may be reduced.

The search systems often fail to yield quality search results because they mostly rely on keywords. The search results provided by conventional search systems are mostly based on a number of keywords or tokens that match between the documents ingested by the search engine (i.e., information stored in the database of the search engine) and the search query and weights of the matched keywords or tokens. Typically, the conventional search systems provide equal weightage or importance to all keywords irrespective of the content of the search query. This further affects the accuracy of the search results in terms of their relevancy and ranking. For example, irrespective of context or content of the search query, the search system may return search results even if none of the important tokens are matching and some of non-important tokens are matching. Thus, the search result may not be accurate.

SUMMARY

In one embodiment, a method for improving ranking of a search result for a search query, is disclosed. In one example, the method may include accessing a plurality of documents of a search result for a search query. Each of the plurality of documents is associated with a plurality of document features, while the search query is associated with a plurality of query features. Additionally, each of the plurality of documents is associated with a set of derived document features that are derived based on an evaluation of the plurality of document features with respect to the plurality of query features. For each of the plurality of documents, the method may further include determining a feature score for each of the set of derived document features based on one or more query features from the plurality of query features, and initializing each element of an order array with the feature score for each of a set of ordered document features. The set of ordered document features are the set of derived document features ordered in a pre-defined order of priority based on a set of pre-defined rules. The method may further include ranking the plurality of documents by comparing and ranking the order array for each of the plurality of documents, and presenting an updated search result based on the ranking of the plurality of documents.

In one embodiment, a system for improving relevancy and ranking of a search result for a search query, is disclosed. In one example, the system may include a ranking device, which may include at least one processor and a computer-readable medium coupled to the processor. The computer-readable medium may store processor executable instructions, which when executed may cause the least one processor to access a plurality of documents of a search result for a search query. Each of the plurality of documents is associated with a plurality of document features, while the search query is associated with a plurality of query features. Additionally, each of the plurality of documents is associated with a set of derived document features that are derived based on an evaluation of the plurality of document features with respect to the plurality of query features. For each of the plurality of documents, the processor executable instructions, on execution, may further cause the least one processor to determine a feature score for each of the set of derived document features based on one or more query features from the plurality of query features, and to initialize each element of an order array with the feature score for each of a set of ordered document features. The set of ordered document features are the set of derived document features ordered in a pre-defined order of priority based on a set of pre-defined rules. The processor executable instructions, on execution, may further cause the least one processor to rank the plurality of documents by comparing and ranking the order array for each of the plurality of documents, and to present an updated search result based on the ranking of the plurality of documents.

In one embodiment, a non-transitory computer-readable medium storing computer-executable instructions for improving relevancy and ranking of a search result for a search query, is disclosed. In one example, the stored instructions, when executed by a processor, may cause the processor to perform operations including accessing a plurality of documents of a search result for a search query. Each of the plurality of documents is associated with a plurality of document features, while the search query is associated with a plurality of query features. Additionally, each of the plurality of documents is associated with a set of derived document features that are derived based on an evaluation of the plurality of document features with respect to the plurality of query features. For each of the plurality of documents, the operations may further include determining a feature score for each of the set of derived document features based on one or more query features from the plurality of query features, and initializing each element of an order array with the feature score for each of a set of ordered document features. The set of ordered document features are the set of derived document features ordered in a pre-defined order of priority based on a set of pre-defined rules. The operations may further include ranking the plurality of documents by comparing and ranking the order array for each of the plurality of documents, and presenting an updated search result based on the ranking of the plurality of documents.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description may be considered as exemplary only, with the true scope and spirit being indicated by the following claims.

Figure 1:
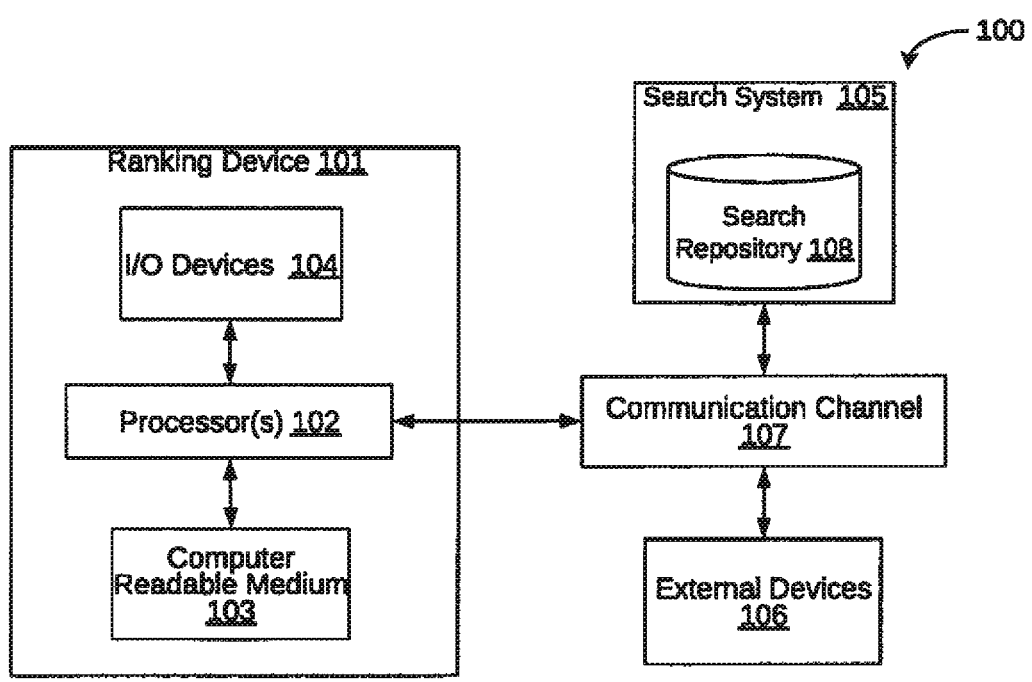
FIG. 1 is a block diagram of an exemplary system for improving relevancy and ranking of a search result, in accordance with some embodiments of the present disclosure.

Referring now to FIG. 1, an exemplary system 100 for improving relevancy and ranking of a search result is illustrated, in accordance with some embodiments of the present disclosure. In particular, the system 100 may include a ranking device 101 for improving relevancy and ranking of a search result for a search query. The ranking device 101 may improve relevancy and ranking of the search result retrieved from the search using natural language processing (NLP).

As will be described in greater detail in conjunction with FIGS. 2-5, the ranking device 101 may access a plurality of documents of a search result for a search query. It may be noted that each of the plurality of documents may be associated with a plurality of document features and the search query may be associated with a plurality of query features. Additionally, it may be noted that each of the plurality of documents may be associated with a set of derived document features that are derived based on an evaluation of the plurality of document features with respect to the plurality of query features. Further, it may be noted that each document feature or each query feature may include at least one of natural language (NL) metadata, indexing metadata, or class metadata. For each of the plurality of documents, the ranking device 101 may further determine a feature score for each of the set of derived document features based on one or more query features from the plurality of query features. For each of the plurality of documents, the ranking device 101 may further initialize each element of an order array with the feature score for each of a set of ordered document features. It may be noted that the set of ordered document features may be the set of derived document features ordered in a pre-defined order of priority based on a set of pre-defined rules. The ranking device 101 may further rank the plurality of documents by comparing and ranking the order array for each of the plurality of documents. The ranking device 101 may further present an updated search result based on the ranking of the plurality of documents.

The ranking device 101 may include but may not be limited to, server, desktop, laptop, notebook, netbook, smartphone, and mobile phone. In particular, the ranking device 101 may include one or more processors 102, a computer-readable medium (e.g. a memory) 103, and input/output devices 104. The computer-readable medium 103 may store the instructions that, when executed by the processors 102, cause the one or more processors 102 to improve relevancy and ranking of a search result for a search query, in accordance with aspects of the present disclosure. The computer-readable medium 103 may also store various data (e.g. plurality of documents in a search result, query class data of the search query, document class data for each document, query NL feature metadata for the given query, document NL feature metadata for each document, query indexing metadata for the given query, document indexing metadata for each document, set of pre-defined rules, evaluation data, derived document features data, feature score for each derived document feature, order array for each document, ordered document features data, relevant group data, irrelevant group data, relevancy and ranking of each document, confidence score for a given rank of a given document, updated search result, etc.) that may be captured, processed, and/or required by the ranking device 101.

The ranking device 101 may interact with a user (not shown) via input/output devices 104. The ranking device 101 may interact with a search system 105 over a communication network 107 for receiving original search result and sending improved or updated search result. In some embodiments, the ranking device 101 may receive the search result from a search repository 108 implemented by the search system 105. The ranking device 101 may further interact with one or more external devices 106 over the communication network 107 for sending and receiving various data (e.g., documents of a search result from a search). The one or more external devices 106 may include, but may not be limited to, a remote server, a digital device, or another computing system.

Figure 2:
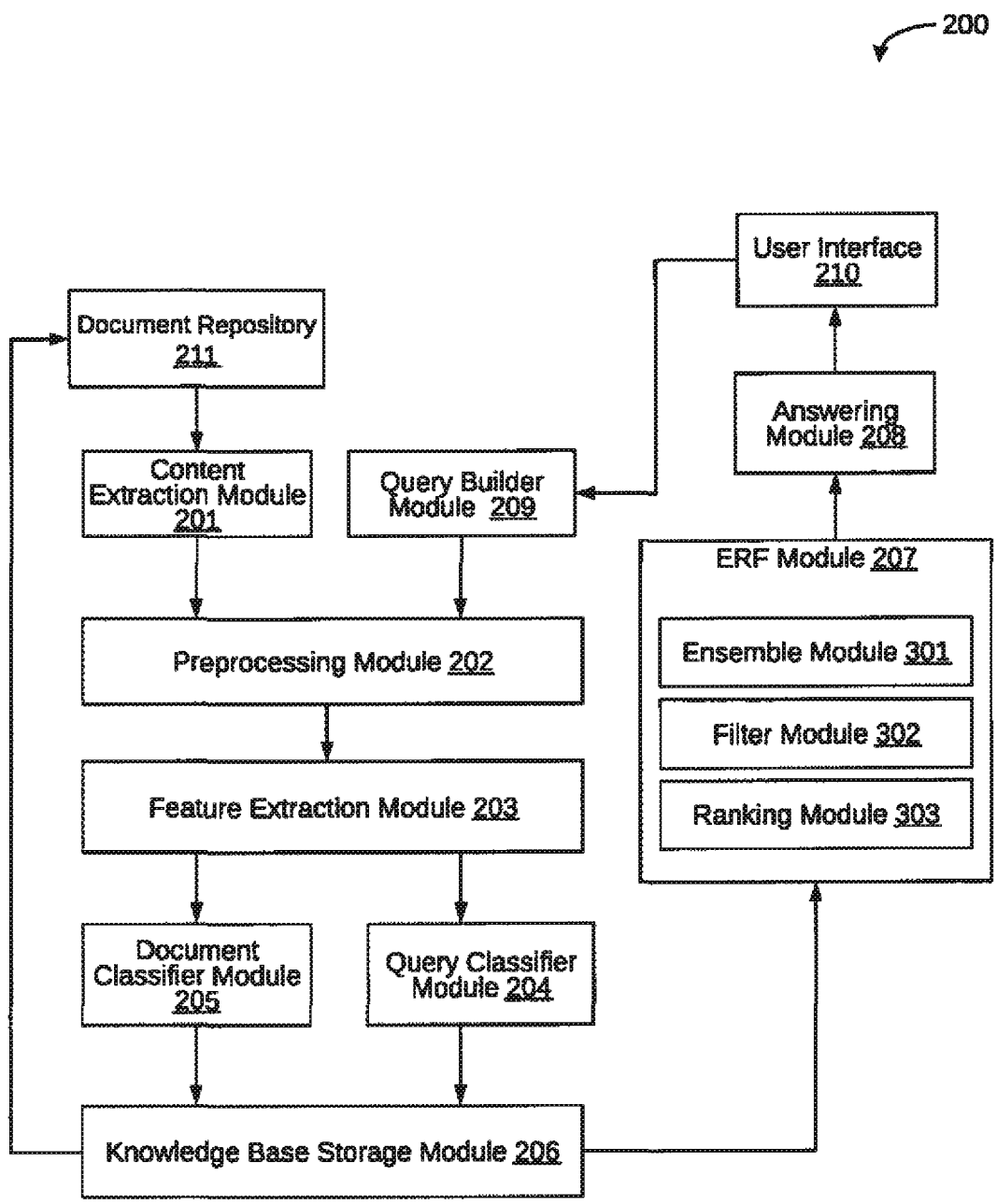
FIG. 2 is a functional block diagram of the exemplary system of FIG. 1, in accordance with some embodiments of the present disclosure.

Referring now to FIG. 2, a functional block diagram of a system 200, analogous to the exemplary system 100 of FIG. 1, is illustrated in accordance with some embodiments of the present disclosure. The system 200 may include various modules that perform various functions so as to improve a search result from a search performed for a search query. In some embodiments, the system 200 may include a content extraction module 201, a pre-processing module 202, a feature extraction module 203, a query classifier module 204, a document classifier module 205, a knowledge base storage module 206, an ensemble, rank, and filter (ERF) module 207, an answering module 208, and a query builder module 209. In some embodiments, the query builder module 209 and the answering module 208 may interact with a user (not shown) by the way of a user interface 210 to receive a query and to present an improved or updated search result to the user. As will be appreciated by those skilled in the art, all such aforementioned modules 201-209 may be represented as a single module or a combination of different modules. Moreover, as will be appreciated by those skilled in the art, each of the modules may reside, in whole or in parts, on one device or multiple devices in communication with each other.

The content extraction module 201 may receive a search result for the search performed for the search query. In some embodiments, the search result may include a plurality of documents. In some embodiments, the content extraction module 201 may receive the plurality of documents from a document repository 211. It may be noted that each of the plurality of documents of the search result may be associated with a plurality of document NL feature metadata, a plurality of document indexing metadata, and at least one document class. The content extraction module 201 may extract content information from the plurality of documents of the search result. In some embodiments, the content extraction module 201 may use a custom document parser to extract the content information. It may be noted that the content information may include title, section headers, tables, and images of each of the plurality of documents.

The preprocessing module 202 may receive the content information extracted by the content extraction module 201. The preprocessing module 202 may preprocess the content information to clean the content information. By way of an example, during preprocessing, junk data, such as stop words and special characters may be removed from the content information. The preprocessed content information may then be sent to the feature extraction module 203.

Once the content information is pre-processed, the feature extraction module 203 may extract a plurality of document NL feature metadata from the content information and store the same in the knowledge base storage module 206. It may be understood that the plurality of document NL feature metadata may be obtained from the knowledge base storage module 206 and may then be employed to determine relevancy and ranking of the documents in the search result. In some embodiment, the plurality of document NL feature metadata may include part-of-speech (POS) tags, keywords, phrases, entities, entity relationships, or dependency parse tree objects. In some embodiments, the feature extraction module 203 may generate a feature list of input document.

The feature extraction module 203 may perform various functions in order to extract the plurality of document NL feature metadata from the content information. In some embodiments, the functions may include chunking of text data returned by the document parser (at sentence level) i.e. the content extraction module 201. The functions may further include identifying the POS tags, identifying phrases, identifying dependency parse tree objects (pobj and dobj), identifying entity, identifying entity relationship, and identifying query class. It may be noted that NL features may play an important role in identifying the right answer. The NL features may help in deciding which tokens (content information) should be given more importance to.

By way of an example, for a query "What should be the printer configuration for it to work?", the feature extraction module 203 may perform the following functions:
Identify nouns: "printer", "configuration";
Identify verbs: "work";
Identify phrases: "printer", "configuration";
Identify entities: "printer";
Parse tree objects: dobj printer, sobj configuration
Identify query class: "Information"

The query classifier module 204 may identify a class of the search query (i.e., query class). In some embodiments, the query classifier module 204 may use machine learning techniques to identify the class of the search query. It may be noted that one or more classes of the search query may be from among a number of pre-defined classes. In some embodiments, the one or more pre-defined classes of the search query may include but may not be limited to, a description, a definition, an abbreviation, a time, a location, a duration, a procedure, a title, a reason, a person, a number, a problem, and an information. As will be appreciated by those skilled in the art, classifying the query may help in improving search result for the search performed for the search query, and, hence, better answers a user's search query.

By way of an example, the class for a search query "What are the steps for changing 7" may be identified as "Procedure". Similarly, the class for a search query "Why do I need to register?" may be identified as "Reason". In the above examples, the class may be identified based on the words of the phrases "what are the steps" and "why do I need to", respectively. It may be understood that the query class may help in eliminating wrong answers, i.e. irrelevant documents from the search result.

By way of another example, the class for a search query "Why do I reset my password" may be identified as "information", and the class for a search query "How to reset my password" may be identified as "procedure". It may be understood that both the above queries include the same tokens (content), and relate to "reset my password". However, classes of both the queries are different. As it will be appreciated, searches performed by conventional search systems for such queries may not be able to identify the underlying difference between the two queries, and hence may fail to provide accurate search results.

Similarly, the document classifier module 205 may identify and extract document class of each of the plurality of documents. It may be noted that the document class may be used for determining relevancy and ranking the search result. As with the query class, one or more classes of a document may be from among a number of pre-defined classes including, but not limited to, a description, a definition, an abbreviation, a time, a location, a duration, a procedure, a title, a reason, a person, a number, a problem, and an information. The document classifier module 205 may be communicatively coupled to the knowledge base storage module 206. The document classifier module 205 may communicate with the knowledge base storage module 206 during receiving the plurality of documents and during execution of the query by a user. During receiving the plurality of documents, the extracted content information, the preprocessed content information and original data related to the plurality of documents may be written to a database. In parallel, the data may be written on to a document repository 211.

The extracted NL features may help in identifying which tokens form the search query and the document are important. From the basics of natural language understanding, the system 200 may know that the main tokens in any user query are the noun and the verb. The phrases may also be extracted, and may be used to compute phrase match score and applied in the ranking and filtering block, i.e. the ERF module 207.

In some embodiments, the knowledge base storage module 206 may extract document NL feature metadata from the content of the plurality of documents. The document NL feature metadata may include POS tags, phrases, entities, and relationships. The knowledge base storage module 206 may further extract other document metadata information including date of creation and author of the document. The document metadata information may further include section information, POS, noun or verb phrases, entities, entity relations, multi-words, synonyms, abbreviations, document class, section class, and concepts.

As will be appreciated, a search may use various techniques, such as Elasticsearch, Solr and Lucene for indexing content of the plurality of documents along with synonyms, and stop-word removal filters.

One of the objectives of the disclosed system 200 is to introduce ways of improving on the normal search systems using NL metadata and classes extracted from the document. As stated above, the disclosed system 200 may extract various NL features metadata from the content of the document as well as classes the document. This data extraction may be performed while ingesting the document for the elastic search.

Figure 3:
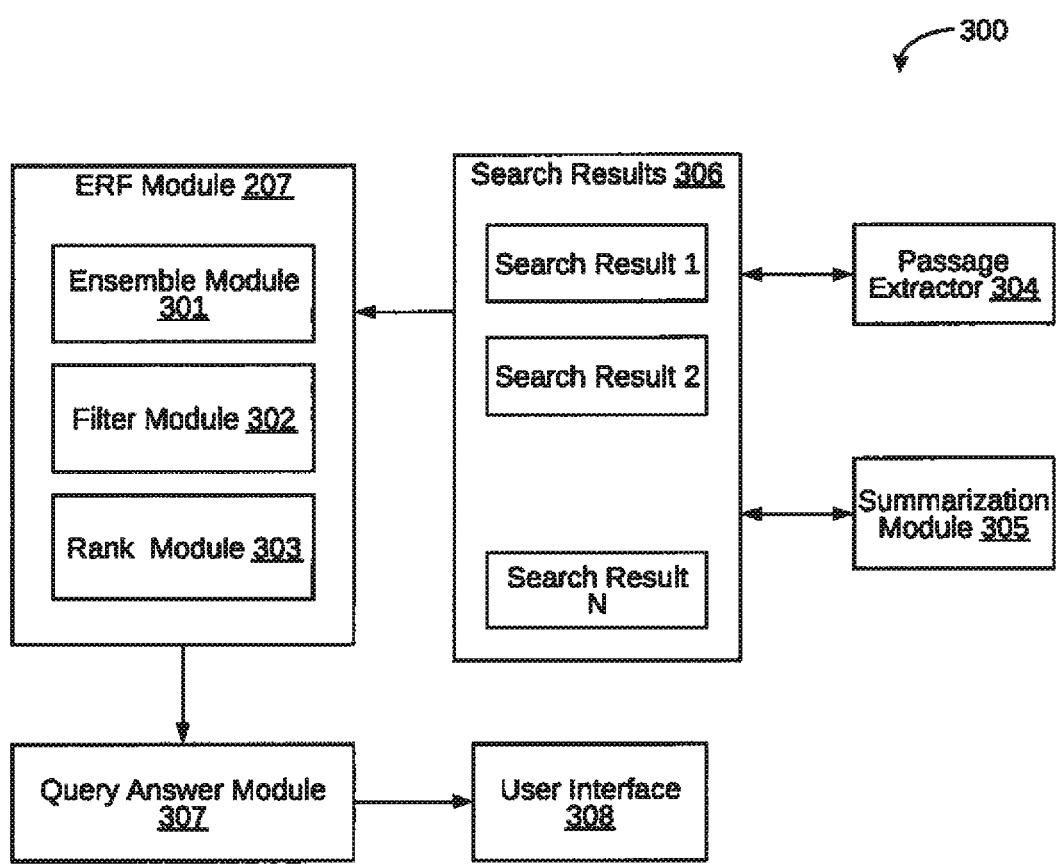
FIG. 3 is a functional block diagram of an ensemble, rank, and filter (ERF) module for improving relevancy and ranking of a search result, in accordance with some embodiments of the present disclosure.

The ERF module 207 may filter and rank documents in the search result. The ERF module 207 is further explained in detail, in conjunction with FIG. 3. Referring now to FIG. 3, a functional block diagram of the ERF module 207 for improving relevancy and ranking of a search result for the search performed for the search query is illustrated, in accordance with some embodiments of the present disclosure. The ERF module 207 may include an ensemble module 301, a filter module 302, and a ranking module 303.

The ERF module 207 may retrieve a search result 306 for the search performed for the search query from an indexing module (not shown). It may be understood that the indexing module may use indexed data for obtaining search results. In some embodiments, the search result 306 obtained by the indexing module may be first received by a passage extraction module 304 and a text summarization module 305. The passage extraction module 304 and the text summarization module 305 may perform passage extraction and text summarization on the search result to extract relevant text from the answer related to the search query.

The ERF module 207 may perform random forest regression on the extracted NL features (i.e., one or more of NL feature metadata) and their ratios to identify important features. The ERF module 207 may further rank and filter the results based on the important NL features or derived document features. It should be noted that a derived document feature may include a combination of important NL features. In some embodiments, the derived document features may also include indexing metadata, or class metadata either alone or in combination with the important NL feature metadata. For example, the important NL feature or derived document feature used by the ERF module 207 may include, but may not be limited to, the following:

Noun match ratio (number of nouns matched between the search query and the returned answer to the total number of nouns in the search query)

Verb match ratio (number of verbs matched between the search query and the returned answer to the total number of verbs in the search query)

Adjectives

Noun phrases—1, 2, 3, 4+ grams (number of noun phrases matched between the search query and the returned answer to the total number of noun phrases in the search query)

verb phrases—1, 2, 3, 4+ grams (number of verb phrases matched between the search query and the returned answer to the total number of verb phrases in the search query)

Multi words

Dependency parse tree type terms (check if dependency terms from the query match in the document)

Non-domain terms (count of non-domain terms)

Query class (Boolean to check if query class has matched)

Terms (ratio of terms matched between search query and answer to the total terms in the search query)

Elastic Search score

In some embodiments, the ERF module 207 may receive the search result from the knowledge base storage module 206. The ERF module 207 may further filter the search result to remove irrelevant documents from the search result. For example, in some embodiments, the ERF module 207 may bucket the given document into a relevant group or an irrelevant group. In some embodiments, the bucketing may be performed by applying a set of pre-defined rules on the set of derived document features for the given document. The ERF module 207 may then retain the set of documents belonging to the relevant group, while removing the remaining documents belonging to the irrelevant group. The ERF module 207 may further rank the search result to provide an improved search result to a user via a query answer module 307 and a user interface 308. For example, in some embodiments, the ERF module 207 may rank a set of documents bucketed into the relevant group. The ranking may be based on a pre-defined order of priority and a score for each of the set of derived document features for each of the set of documents. In other words, the set of documents bucketed into the relevant group may be ranked based on a type of derived document feature (i.e., type of key features forming the derived document feature) and score of the derived document feature (i.e., aggregate score of the key features forming the derived document feature).

By way of an example, following categories of documents in the search result may be put into valid buckets {(Rules) (Valid)}:

a. Keywords Bases—KW b. 2, 3, 4+ gram phrases match above a threshold—PM0 c. Noun and Verb phrase match ratio is above a threshold and passage score is above a threshold d. Passage score, Noun and verb match ratio, DEP match ratio—TH0 e. Passage and ES score above a threshold—all the nouns matched and terms matched and non-domain term match is less than a threshold, if query verb exists than verb match ratio—TH1 f. Passage and ES score above a threshold—all the nouns matched and terms matched and non-domain term match is less than a threshold when no verb identified in query. —TH2 g. Metadata booster b. is above a threshold and noun and verb match is above a threshold—~TH3 h. Metadata booster b. is above a threshold and noun matched and non-domain term match ratio is less than the threshold and RIM score is above threshold—TH4 i. Metadata booster b. is above a threshold and noun matched and non-domain term match ratio is less than the threshold, Metadata booster b. is above a threshold—TH5 j. ES result matched index less than threshold and no non-domain terms matched, all terms matched and noun and verb match ratio above threshold. —TH6 k. ES result matched index less than threshold and no non-domain terms matched, noun and verb match ratio above threshold—TH7 l. Noun and Verb phrase match ratio above threshold and noun match ratio above a threshold and verb match ratio above a threshold—SM0 m. Noun and Verb phrase match ratio above threshold and noun match ratio above a threshold and no query verb phrase identified in search query—SM1 n. Matched Deep parse tree terms which are part of domain key dictionary match ratio is above a threshold and matched dep terms match ratio above a threshold—SM2 o. Noun and Verb phrases not identified in search query and noun match ratio above a threshold and verb match ratio above a threshold—SM3 p. Noun and Verb phrases not identified in search query and noun match ratio above a threshold and no query verb phrase identified in search query—SM4

Further, by way of an example, following categories of documents in the search result may be put into invalid buckets {(Rules)(Invalid)}:

a. User query class and Result query class has not matched—NO b. For non-FAQ document results—which are not part of PM0, PM1, SM0, SM1, SM2, SM3, SM4, TH3 result type passage, and deep parse tree type match threshold—N1 c. With query verb found in user query and none of the verbs matched and passage score threshold—N2 d. Results which are not part of PM0, PM1 result type—Noun/verb phrase match ratio is below a threshold and dep parse tree term count is below a threshold—N3 e. Results which are not part of PM0, PM1, SM0, SM1, SM2, SM3, SM4 result type and query class identified for search query and passage score match ratio is less than a threshold—N4 f. Deep parse tree terms match and keywords match is less than threshold—N5

In some embodiments, identifying the thresholds for different result types and their associated priority may be automated. It may be noted that the identifying may be automated based on the test data and the ingested data in the knowledge base storage module 206, by running a script. Result types grouped together can create new valid and invalid result types. Ex: TH0, TH1 individually might not be important as per data ingested and test data. So, they may be moved (suggest) to the Invalid list. But (TH0, TH1) together can be a valid result type. This information is also captured by the automated script. Prioritizing of the result type groups is also automated. Following example shows how the priorities are set. Grouping the result type (for example, (PM0, TH0, TH1) group) may be given higher priority, than other groups (for example, (PM0) group or (PM0, TH0) group). User feedback may be used to identify Valid and Invalid Result type and groups over time.

In some embodiments, the ERF module 207 may periodically analyze the search result 306. The ERF module 207 may then fine-tune the pre-defined rules and associated thresholds (e.g., rules for determining relevancy or bucketing, rules for ranking, associated thresholds) so as to further refine relevancy and ranking of the search result 306. It should be noted that, in some embodiments, the fine-tuning of the pre-defined rules may be performed manually or automatically using a machine-learning model. It may be noted that the fine-tuning may vary from case to case, depending on the type of documents received (i.e., knowledge being ingested) and user feedback received on the search result 306. Further, it should be noted that the thresholds and the pre-defined rules may be modified, deleted or generated afresh.

Figure 4:
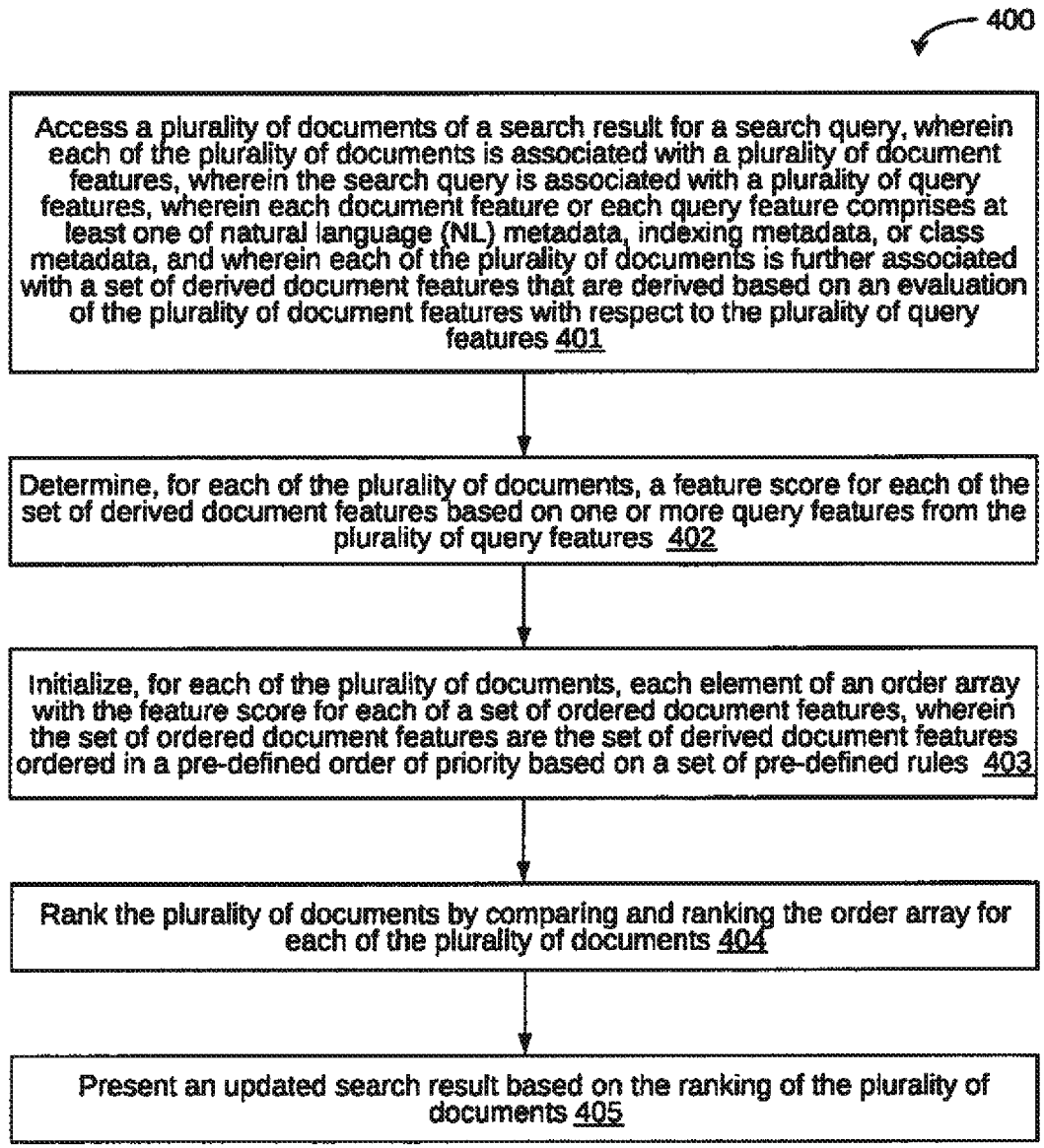
FIG. 4 is a flow diagram of an exemplary process for improving relevancy and ranking of a search result, in accordance with some embodiments of the present disclosure.

Referring now to FIG. 4, an exemplary process 400 for improving relevancy and ranking of a search result for a search query is depicted via a flowchart, in accordance with some embodiments of the present disclosure. At step 401, the ranking device 101 may access a plurality of documents of the search result for the search query. It may be noted that each of the plurality of documents may be associated with a plurality of document features and the search query may be associated with a plurality of query features. Additionally, it may be noted that each document feature or each query feature comprises at least one of NL metadata, indexing metadata, or class metadata. Further, it may be noted that each of the plurality of documents may be further associated with a set of derived document features that are derived based on an evaluation of the plurality of document features with respect to the plurality of query features. At step 402, the ranking device 101 may determine, for each of the plurality of documents, a feature score for each of the set of derived document features based on one or more query features from the plurality of query features. At step 403, the ranking device 101 may initialize, for each of the plurality of documents, each element of an order array with the feature score for each of a set of ordered document features. It may be noted that the set of ordered document features may be the set of derived document features ordered in a pre-defined order of priority based on a set of pre-defined rules. At step 404, the ranking device 101 may rank the plurality of documents by comparing and ranking the order array for each of the plurality of documents. At step 405, the ranking device 101 may present an updated search result based on the ranking of the plurality of documents.

In some embodiments, the ranking device 101 may boost or penalize each element of the order array with a factor based on the set of pre-defined rules. Additionally, in some embodiments, the ranking device 101 may bucket each of the plurality of documents into one of a relevant group and an irrelevant group. It may be noted that bucketing a given document may be based on the set of derived document features for the given document and the set of pre-defined rules. In such embodiments, the ranking device 101 may rank the plurality of documents at step 404 by ranking a set of relevant documents from among the plurality of documents. It may be noted that the set of relevant documents may be documents bucketed into the relevant group.

In some embodiments, the ranking device 101 determines a confidence score for a given rank of a given document based on a statistical average of the feature score for each of the set of derived document features. Additionally, in some embodiments, the ranking device 101 may tune the set of pre-defined rules based on an analysis of the updated search result.

It may be noted that the NL metadata may include, but may not be limited to, part-of-speech (POS) tags, phrases, entities, entity relationships, or dependency parse tree objects. It may be further noted that the indexing metadata may include, but may not be limited to, keywords, synonyms, abbreviations, a date of creation, or an author. It may be further noted that the class metadata may include, but may not be limited to, an abbreviation, a duration, a procedure, a title, a reason, a person, a location, a time, a number, a problem, an information, a description, or a definition.

Additionally, it may be noted that the set of derived document features may include, but may not be limited to, a noun match ratio, a verb match ratio, adjectives, multi-words, a noun phrase match ratio, a verb phrase match ratio, a keywords match ratio, a phrase match ratio, dependency keywords, a count of non-domain keywords, a passage score, an elastic search score, or a combination thereof.

Figure 5:
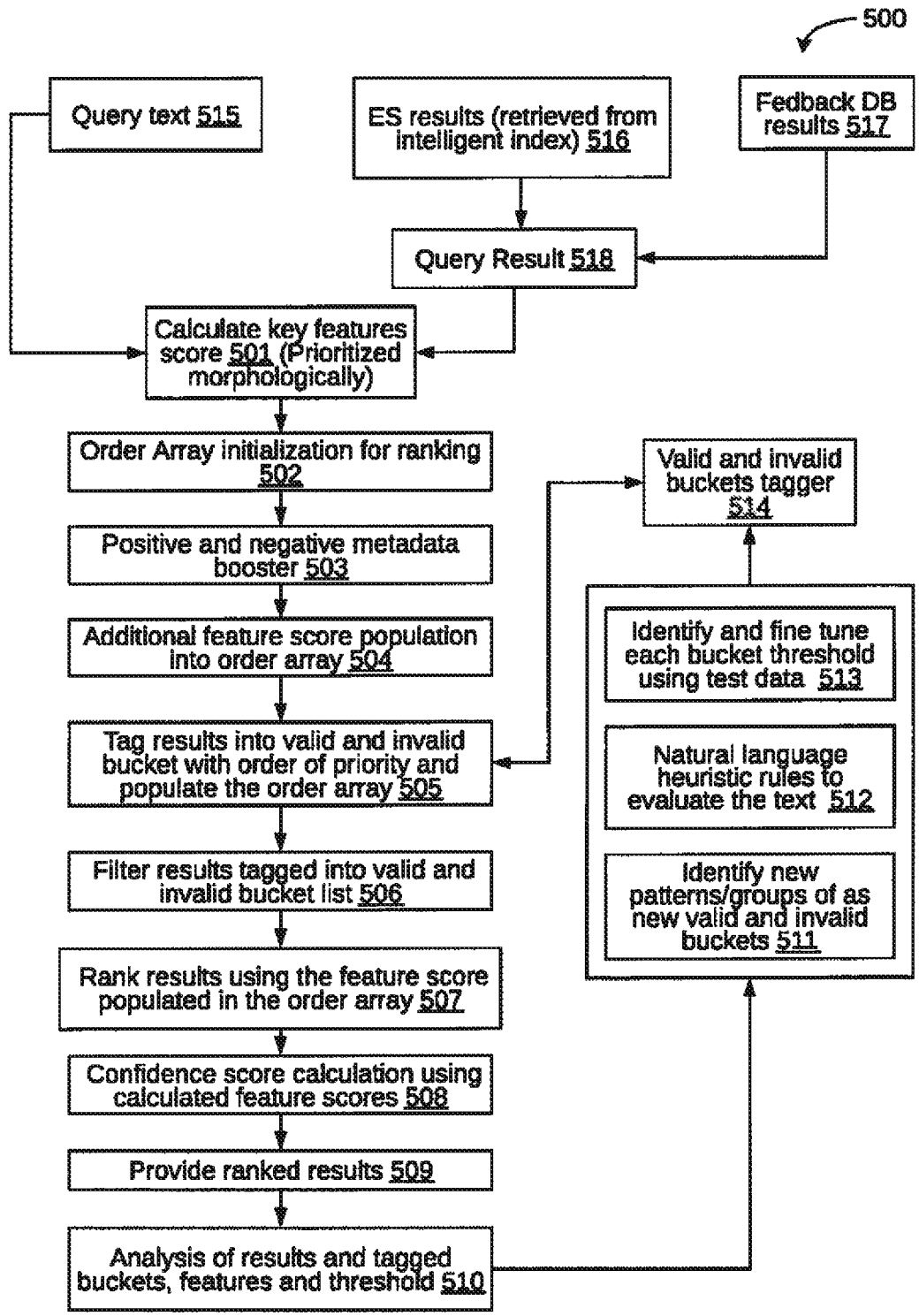
FIG. 5 is a flow diagram of a detailed exemplary process for improving relevancy and ranking of a search result, in accordance with some embodiments of the present disclosure.

Referring now to FIG. 5, a detailed exemplary process 500 for improving relevancy and ranking of a search result is depicted via a flowchart, in accordance with an embodiment of the present disclosure. Initially, a query text 515 may be received from a user as input. In some embodiments, the query text 515 may be parsed to extract various query features comprising of NL metadata, class metadata, and indexing metadata. In some embodiments, an elastic-search (ES) query may be prepared using the parsed query text 515 and the extracted query features. The elastic-search query may be run to hit different elastic-search indexes and retrieve ES results 516. For example, the indexes may include frequently asked question (FAQ) questions-answers, only FAQ questions, only FAQ answers, standard operating procedure (SOP) content, and so forth. It may be understood that the query may be fired upon different indexes in the elastic-search engine. Accordingly, the top 'n' relevant ES results 516 may be obtained. Additionally, in some embodiments, the feedback database (DB) query may be prepared using the parsed query text 515 and the extracted query features. The feedback DB query may be run to hit feedback database DB and retrieve feedback DB results 517. It may be noted that the feedback DB results 517 may include results for similar user queries in the past that received high rating on user feedback. Thus, the query result (i.e., search results) 518 may include an ensemble of top 'n' relevant ES results 516 and feedback DB results 517. Once the query result 518 is finalized, the process 500 may improve relevancy and ranking of the search result as described herein below.

At step 501, key features score (i.e., score for each derived document feature) for each document in the query result 518 may be calculated. It may be noted that the key features (i.e., derived document features) may be prioritized morphologically based on a type and an importance of derived features using a set of pre-defined rules. At step 502, an order array may be initialized, for each document in the query result 518, with the respective key features score. In particular, each element of the order array for a given document may be initialized with the feature score of each of the key features, in a pre-defined order of priority, for the given document. As stated above, the key features are prioritized morphologically using the set of pre-defined rules.

At step 503, each element of the order array may be boosted or penalized based on the set of pre-defined rules. In other words, each of the key feature scores may be positively or negatively boosted based on the pre-defined rules. It may be noted that, in some embodiments, the key feature score may be boosted, positively or negatively, using one or more positive and negative metadata boosters, respectively. It may be understood that the one or more positive and negative metadata boosters may be configurable coefficients, which may include document name, section, directory, FAQ class term, noun+verb phrase matched, matched dep parse tree terms, matched noun and verbs, and boost the order bit according to the priority of query class identified (ref: QCP).

At step 504, an additional feature score for each document may be populated into the order array for that document. At step 505, the documents in the query result 518 may be tagged into valid and invalid bucket list based on the set of pre-defined rules. In some embodiments, the documents may be categorized (tagged) based on order of priority. Further, the order array may be populated accordingly. At step 506, the query result 518 may be filtered based upon valid and invalid bucket list. For example, the documents in the query result 518 belonging to the valid bucket may be retained, while the documents in the query result 518 belonging to the invalid bucket may be discarded.

At step 507, the query result 518 may be ranked. In some embodiments, the query result 518 may be ranked based on feature score populated in the order array. In other words, the documents in the query result 518 may be ranked by comparing and ranking the order array for each of the documents. In some embodiments, the ranking may be performed for only those documents in the query result 518 that belong to the valid bucket. At step 508, a confidence score may be calculated using the calculated feature score. At step 509, an updated query result 518 with rank of each document and a corresponding confidence score may be provided to a user. At step 510, an analysis may be performed of the updated query result 518, tagged buckets, features, and one or more thresholds. The pre-defined rules for morphological prioritization of key features, boosting or penalizing feature scores, generating tagged buckets (i.e., valid and invalid documents), and corresponding thresholds may be fined-tuned regularly over time based on the analysis. In some embodiments, the tagged buckets and the thresholds may be fine-tuned manually. In alternative embodiments, the tagged buckets and the thresholds may be fine-tuned using a machine-learning model, upon analyzing the accuracy of the machine-learning model. It may be noted that the fine-tuning may vary from case to case, depending on the type of documents received (i.e., knowledge being ingested). The thresholds and business rules, if any, may be modified, deleted or generated afresh.

For example, at step 511, new patterns/groups may be identified as valid and invalid buckets. Additionally, for example, at step 512, NL heuristic rules may be applied to evaluate the query text 515 or document text (for example, a sentence in the document or query). Further, for example, at step 513, each of one or more bucket thresholds may be identified and fine-tuned, using test data. At step 514, valid and invalid bucket tagger (i.e., pre-defined rules for tagging documents into valid or invalid bucket) as well as any other pre-defined rules (e.g., for prioritization of key features, for boosting feature scores, etc.) may be provided to various steps in the control logic 500 while generating the updated search result. Accordingly, the tagged results may be put into the valid and the invalid bucket with order of priority. Thereafter, the order bit may be populated.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the technology. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the technology. When implemented on a general-purpose microprocessor, the computer program code segments configure the microprocessor to create specific logic circuits.

Figure 6:
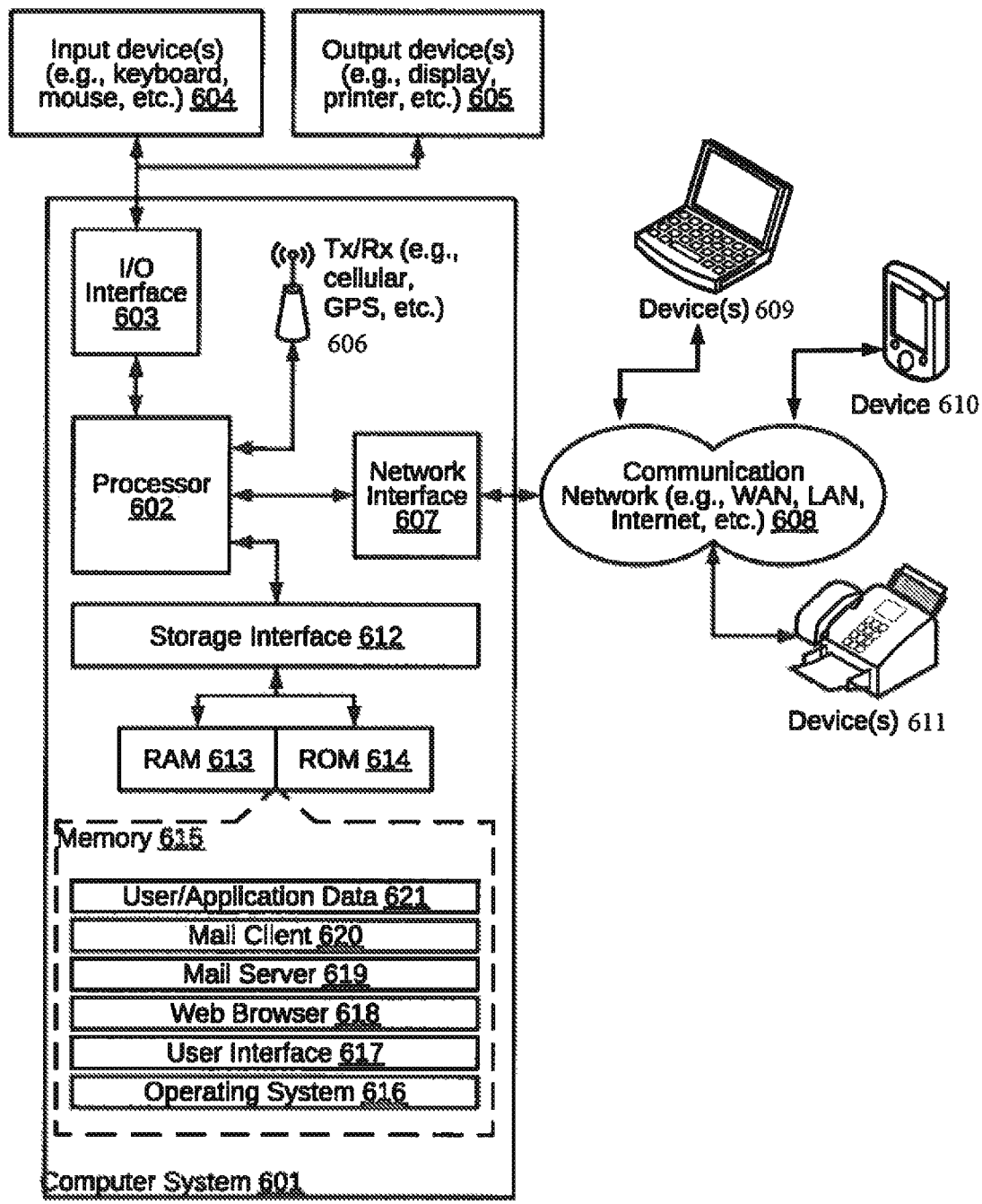
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 for improving relevancy and ranking of a search result for a search performed for a search query. Computer system 601 may include a central processing unit ("CPU" or "processor") 602. The processor 602 may include at least one data processor for executing program components for executing user-generated or system-generated requests. A user may include a person, a person using a device such as those included in this disclosure, or such a device itself. The processor 602 may include specialized processing units such as integrated system (bus) controllers, memory management control units, floating point units, graphics processing units, digital signal processing units, etc. The processor 602 may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver 606 may facilitate various types of wireless transmission or reception. For example, the transceiver 606 may include an antenna operatively connected to a transceiver chip (e.g., TEXAS INSTRUMENTS® WILINK WL1283®, BROADCOM® BCM4750IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface 607 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices 609, 610, and 611 may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK®, etc.), laptop computers, notebooks, gaming consoles (MICROSOFT® XBOX®, NINTENDO® DS®, SONY® PLAYSTATION®, etc.), or the like. In some embodiments, the computer system 601 may itself embody one or more of these devices 609, 610, and 611.

In some embodiments, the processor 602 may be disposed in communication with one or more memory devices 615 (e.g., RAM 613, ROM 614, etc.) via a storage interface 612. The storage interface 612 may connect to memory devices 615 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 615 may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of the operating systems 616 include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. The user interface 617 may facilitate display, execution, interaction, manipulation, or operation of program components through textual or graphical facilities. For example, the user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE® MACINTOSH® operating systems' AQUA®, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 601 may implement the web browser 618 stored program component. The web browser 618 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. The web browsers 618 may utilize facilities such as AJAX®, DHTML, ADOBE® FLASH®, JAVASCRIPT®, JAVA®, application programming interfaces (APIs), etc. In some embodiments, the computer system 601 may implement the mail server 619 stored program component. The mail server 619 may be an Internet mail server such as MICROSOFT® EXCHANGE®, or the like. The mail server 619 may utilize facilities such as ASP, ActiveX, ANSI C++/C#, MICROSOFT .NET®, CGI scripts, JAVA®, JAVASCRIPT®, PERL®, PHP®, PYTHON®, WebObjects, etc. The mail server 619 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 601 may implement the mail client 620 stored program component. The mail client 620 may be a mail viewing application, such as APPLE MAIL®, MICROSOFT ENTOURAGE®, MICROSOFT OUTLOOK®, MOZILLA THUNDERBIRD®, etc.

In some embodiments, computer system 601 may store the user/application data 621, such as the data, variables, records, etc. (e.g., plurality of documents in a search result, query class data of search query, document class data for each document, query NL feature metadata for the search query, document NL feature metadata for each document, query indexing metadata for the search query, document indexing metadata for each document, set of pre-defined rules, evaluation data, derived document features data, feature score for each derived document feature, order array for each document, ordered document features data, relevant group data, irrelevant group data, relevancy and ranking of each document, confidence score for a given rank of a given document, updated search result, etc.) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of any computer or database component may be combined, consolidated, or distributed in any working combination.

As will be appreciated by those skilled in the art, the techniques described in the various embodiments discussed above provide for improving relevancy and ranking of a search result from a search performed for a search query. In particular, the techniques provide for an intelligent system that allows for improving relevancy and ranking of the search result from the search performed for the search query using natural language processing (NLP). The techniques further use indexed metadata involving part-of-speech (POS) tags and synonyms for assigning weight to important words/phrases. Accordingly, the techniques provide for an improved ranking over the ranking provided by the current search techniques. The ranking is based on various features which include phrase matching between the search query and a result returned by the search, entity and relationship matching, query class matching between the search query and the results returned, along with the query tokens and the answer tokens matching. As such, by using additional metadata, the techniques help in improving the accuracy of the results returned by the search system, and in better filtering and ranking of the returned results based on the above-mentioned features.

The specification has described method and system for improving relevancy and ranking of a search result from a search performed for a search query. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for improving ranking of a search result for a search query, the method comprising:
    accessing, by a ranking device, a plurality of documents of a search result for a search query, wherein each of the documents is associated with a plurality of document features, the search query is associated with a plurality of query features, each of the document features or each of the query features comprises at least one of natural language (NL) metadata, indexing metadata, or class metadata, and each of the plurality of documents is further associated with a set of derived document features that are derived based on an evaluation of the document features with respect to the query features, wherein the set of derived document features is determined by performing forest regression on the NL metadata and their ratios;

determining, by the ranking device and for each of the documents, a feature score for each of the set of derived document features based on one or more of the query features from the plurality of query features;

initializing, by the ranking device and for each of the plurality of documents, each element of an order array with the feature score for each of a set of ordered document features, wherein the set of ordered document features comprise the set of derived document features ordered in a pre-defined order of priority based on a set of pre-defined rules;

ranking, by the ranking device, the documents by comparing and ranking the order array for each of the documents and a set of relevant documents bucketed from among the documents; wherein the set of relevant documents comprises documents bucketed into a relevant group; and wherein bucketing each of the documents into the relevant group or an irrelevant group is based on applying the set of pre-defined rules on the set of derived document features for the document, and wherein the set of relevant documents are ranked based on a type of derived document feature and an aggregate score associated with the derived document feature; and outputting, by the ranking device, an updated search result based on the ranking of the documents.

2. The method of claim 1, further comprising boosting or penalizing, by the ranking device, each element of the order array with a factor based on the set of pre-defined rules.

3. The method of claim 1, further comprising:
ranking, by the ranking device, a set of relevant documents from among the documents is based on a pre-defined order of priority and the aggregate score associated with the derived document features for each of the set of documents.

4. The method of claim 1, further comprising determining, by the ranking device, a confidence score for a rank of one or more of the documents based on a statistical average of the feature score for each of the set of derived document features.

5. The method of claim 1, further comprising tuning, by the ranking device, the set of pre-defined rules based on an analysis of the updated search result.

6. The method of claim 1, wherein:
the NL metadata comprises at least one of POS tags, phrases, entities, entity relationships, or dependency parse tree objects;
the indexing metadata comprises at least one of keywords, synonyms, abbreviations, a date of creation, or an author;
the class metadata comprises at least one of an abbreviation, a duration, a procedure, a title, a reason, a person, a location, a number, a problem, an information, a description, or a definition; and
the set of derived document features comprises at least one of a noun match ratio, a verb match ratio, adjectives, multi-words, a noun phrase match ratio, a verb phrase match ratio, a keywords match ratio, a phrase match ratio, dependency keywords, a count of non-domain keywords, a passage score, or an elastic search score.

7. A ranking device, comprising:
at least one processor; and
a memory coupled to the processor and storing instructions that, when executed by the processor, cause the processor to:
access a plurality of documents of a search result for a search query, wherein each of the documents is associated with a plurality of document features, the search query is associated with a plurality of query features, each of the document features or each of the query features comprises at least one of natural language (NL) metadata, indexing metadata, or class metadata, and each of the documents is further associated with a set of derived document features that are derived based on an evaluation of the document features with respect to the query features, wherein the set of derived document features is determined by performing forest regression on the NL metadata and their ratios;
determine, for each of the documents, a feature score for each of the set of derived document features based on one or more of the query features from the plurality of query features;
initialize, for each of the plurality of documents, each element of an order array with the feature score for each of a set of ordered document features, wherein the set of ordered document features comprise the set of derived document features ordered in a pre-defined order of priority based on a set of pre-defined rules;
rank the documents by comparing and ranking the order array for each of the documents and a set of relevant documents bucketed from among the documents; wherein the set of relevant documents comprises documents bucketed into a relevant group; and wherein bucketing each of the documents into the relevant group or an irrelevant group is based on applying the set of pre-defined rules on the set of derived document features for the document, and wherein the set of relevant documents are ranked based on a type of derived document feature and an aggregate score associated with the derived document feature; and
output an updated search result based on the ranking of the documents.

8. The ranking device of claim 7, wherein the instructions, when executed by the processor, further cause the processor to boost or penalize each element of the order array with a factor based on the set of pre-defined rules.

9. The ranking device of claim 7, wherein the instructions, when executed by the processor, further cause the processor to:
rank a set of relevant documents from among the documents based on a pre-defined order of priority and the aggregate score associated with the derived document features for each of the set of documents.

10. The ranking device of claim 7, wherein the instructions, when executed by the processor, further cause the processor to determine a confidence score for a rank of one or more of the documents based on a statistical average of the feature score for each of the set of derived document features.

11. The ranking device of claim 7, wherein the instructions, when executed by the processor, further cause the processor to tune the set of pre-defined rules based on an analysis of the updated search result.

12. The ranking device of claim 7, wherein:
the NL metadata comprises at least one of POS tags, phrases, entities, entity relationships, or dependency parse tree objects;
the indexing metadata comprises at least one of keywords, synonyms, abbreviations, a date of creation, or an author;
the class metadata comprises at least one of an abbreviation, a duration, a procedure, a title, a reason, a person, a location, a number, a problem, an information, a description, or a definition; and
the set of derived document features comprises at least one of a noun match ratio, a verb match ratio, adjectives, multi-words, a noun phrase match ratio, a verb phrase match ratio, a keywords match ratio, a phrase match ratio, dependency keywords, a count of non-domain keywords, a passage score, or an elastic search score.

13. A non-transitory computer readable medium having stored thereon instructions for improving ranking of a search result for a search query comprising executable code which when executed by one or more processors, causes the one or more processors to:
access a plurality of documents of a search result for a search query, wherein each of the documents is associated with a plurality of document features, the search query is associated with a plurality of query features, each of the document features or each of the query features comprises at least one of natural language (NL) metadata, indexing metadata, or class metadata, and each of the documents is further associated with a set of derived document features that are derived based on an evaluation of the document features with respect to the query features, wherein the set of derived document features is determined by performing forest regression on the NL metadata and their ratios;
determine, for each of the documents, a feature score for each of the set of derived document features based on one or more of the query features;
initialize, for each of the plurality of documents, each element of an order array with the feature score for each of a set of ordered document features, wherein the set of ordered document features comprise the set of derived document features ordered in a pre-defined order of priority based on a set of pre-defined rules;
rank the documents by comparing and ranking the order array for each of the documents and a set of relevant documents bucketed from among the documents; wherein the set of relevant documents comprises documents bucketed into a relevant group; and wherein bucketing each of the documents into the relevant group or an irrelevant group is based on applying the set of pre-defined rules on the set of derived document features for the document, and wherein the set of relevant documents are ranked based on a type of derived document feature and an aggregate score associated with the derived document feature; and
output an updated search result based on the ranking of the documents.

14. The non-transitory computer-readable medium of claim 13, wherein the executable code, when executed by the processors, further causes the processors to boost or penalize each element of the order array with a factor based on the set of pre-defined rules.

15. The non-transitory computer-readable medium of claim 13, wherein the executable code, when executed by the processors, further causes the processors to:
rank a set of relevant documents from among the documents based on a pre-defined order of priority and the aggregate score associated with the derived document features for each of the set of documents.

16. The non-transitory computer-readable medium of claim 13, wherein the executable code, when executed by the processors, further causes the processors to determine a confidence score for a rank of one or more of the documents based on a statistical average of the feature score for each of the set of derived document features.

17. The non-transitory computer-readable medium of claim 13, wherein the executable code, when executed by the processors, further causes the processors to tune the set of pre-defined rules based on an analysis of the updated search result.

18. The non-transitory computer-readable medium of claim 13, wherein:
the NL metadata comprises at least one of POS tags, phrases, entities, entity relationships, or dependency parse tree objects;
the indexing metadata comprises at least one of keywords, synonyms, abbreviations, a date of creation, or an author;
the class metadata comprises at least one of an abbreviation, a duration, a procedure, a title, a reason, a person, a location, a number, a problem, an information, a description, or a definition; and
the set of derived document features comprises at least one of a noun match ratio, a verb match ratio, adjectives, multi-words, a noun phrase match ratio, a verb phrase match ratio, a keywords match ratio, a phrase match ratio, dependency keywords, a count of non-domain keywords, a passage score, or an elastic search score.

* * * * *